(12) United States Patent
Funahashi et al.

(10) Patent No.: US 11,650,178 B2
(45) Date of Patent: May 16, 2023

(54) METHOD FOR BONDING CYCLOOLEFIN POLYMER TO METAL, METHOD FOR PRODUCING BIOSENSOR, AND BIOSENSOR

(71) Applicant: SAMCO INC., Kyoto (JP)

(72) Inventors: Risa Funahashi, Kyoto (JP); Taichi Hashimoto, Kyoto (JP); Hirokazu Terai, Koka (JP); Fumina Miyake, Kyoto (JP)

(73) Assignee: SAMCO INC., Kyoto (JP)

( * ) Notice: Subject to any disclaimer, the term of this patent is extended or adjusted under 35 U.S.C. 154(b) by 127 days.

(21) Appl. No.: 16/770,378

(22) PCT Filed: Dec. 10, 2018

(86) PCT No.: PCT/JP2018/045352
§ 371 (c)(1),
(2) Date: Jun. 5, 2020

(87) PCT Pub. No.: WO2019/117092
PCT Pub. Date: Jun. 20, 2019

(65) Prior Publication Data
US 2020/0386707 A1     Dec. 10, 2020

(30) Foreign Application Priority Data

Dec. 11, 2017  (JP) .............................. JP2017-237059

(51) Int. Cl.
*G01N 27/327*     (2006.01)
*B32B 15/085*    (2006.01)
*B32B 38/00*     (2006.01)

(52) U.S. Cl.
CPC ......... *G01N 27/327* (2013.01); *B32B 15/085* (2013.01); *B32B 38/0008* (2013.01)

(58) Field of Classification Search
CPC .............. B29C 66/028; B29C 66/0012; B29C 66/72326; B29C 65/823; B29C 66/1122;
(Continued)

(56) References Cited

U.S. PATENT DOCUMENTS

2013/0192751 A1* 8/2013 Arai .................. B29C 66/30325
156/272.8
2016/0220995 A1 8/2016 Atashbar et al.

FOREIGN PATENT DOCUMENTS

CN      103052493 A     4/2013
JP      2011-203032 A   10/2011
(Continued)

OTHER PUBLICATIONS

Feb. 26, 2019 International Search Report issued in International Patent Application No. PCT/JP2018/045352.
(Continued)

*Primary Examiner* — S. Behrooz Ghorishi
(74) *Attorney, Agent, or Firm* — Oliff PLC

(57) ABSTRACT

A method for bonding a first member having a first bond-target surface made of cycloolefin polymer to a second member having a second bond-target surface made of metal. The method includes a process of exposing the first bond-target surface and the second bond-target surface to at least one of the $H_2O$ plasma and $O_2$ plasma, as well as a process of combining the first bond-target surface and the second bond-target surface.

2 Claims, 6 Drawing Sheets

(58) Field of Classification Search
CPC ... B29C 66/43; B29C 66/73772; B29C 66/71; B29C 66/73771; B29C 66/7465; B29C 66/826; B29C 65/002; B29C 66/01; B29K 2023/38; C08J 2323/00; C08J 2345/00; C08J 5/12; C08J 7/123; C09J 2400/143; C09J 2400/146; C09J 2423/006; C09J 2423/008; C09J 5/02; B32B 27/00
See application file for complete search history.

(56) References Cited

FOREIGN PATENT DOCUMENTS

| | | | | |
|---|---|---|---|---|
| JP | 2012-056308 A | 3/2012 | | |
| WO | WO-2013154037 A1 | * 10/2013 | ......... | B29C 65/1629 |
| WO | WO-2014123022 A1 | * 8/2014 | ......... | B23K 26/0006 |
| WO | 2015/038767 A1 | 3/2015 | | |

OTHER PUBLICATIONS

Feb. 26, 2019 Written Opinion issued in International Patent Application No. PCT/JP2018/045352.

* cited by examiner

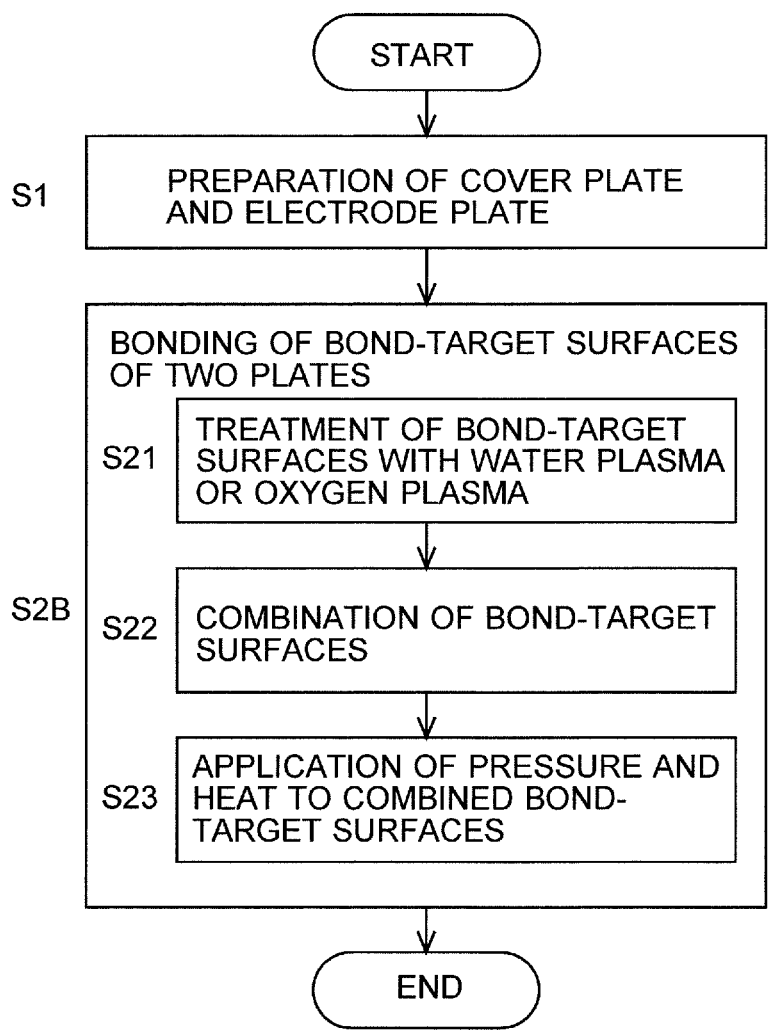

Fig. 4

|  | RF POWER (W) | INTRO-DUCED GAS | FLOW RATE (sccm) | PRESSURE (Pa) | TREATMENT PERIOD (sec) |
|---|---|---|---|---|---|
| EXAMPLES 1, 2 REFERENCE EXAMPLES 1-3 | 100 | WATER VAPOR | 20 | 5 | 40 |

Fig. 5

|  | COMPRESSION PERFORMED AFTER OVERLAPPING | BONDING STRENGTH (N/cm2) | EVALUATION OF BONDING |
|---|---|---|---|
| EXAMPLE 1 | NO | 126 | BONDED |
| REFERENCE EXAMPLE 1 | YES | 464.4 | BONDED |
| EXAMPLE 2 | NO | 179.5 | BONDED |
| REFERENCE EXAMPLE 2 | YES | 133.3 | BONDED |
| REFERENCE EXAMPLE 3 | YES | 257.1 | BONDED |

Fig. 6

|  | RF POWER (W) | INTRO-DUCED GAS | FLOW RATE (sccm) | PRESSURE (Pa) | TREATMENT PERIOD (sec) |
|---|---|---|---|---|---|
| EXAMPLE 3 | 100 | WATER VAPOR | 20 | 5 | 40 |
| EXAMPLE 4 | 100 | OXYGEN | 20 | 5 | 40 |

Fig. 7A
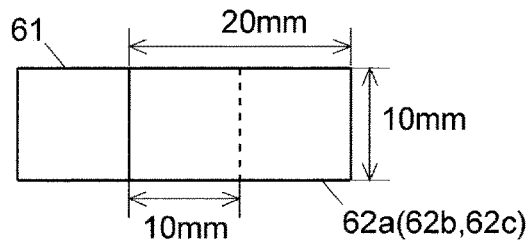
Fig. 7B
Fig. 8
| | WHETHER OR NOT BONDING WAS ACHIEVED | | |
|---|---|---|---|
| | COP SAMPLE AND 1ST METAL SAMPLE (Ru) | COP SAMPLE AND 2ND METAL SAMPLE (Ni-W) | COP SAMPLE AND 3RD METAL SAMPLE (Au) |
| EXAMPLE 3 | ○ | ○ | ○ |
| EXAMPLE 4 | ○ | ○ | ○ |
| COMPARATIVE EXAMPLE 1 | × | × | × |
| COMPARATIVE EXAMPLE 2 | × | × | × |
| COMPARATIVE EXAMPLE 3 | × | × | × |
LEGEND: ○ ··· BONDED
× ··· NOT BONDED
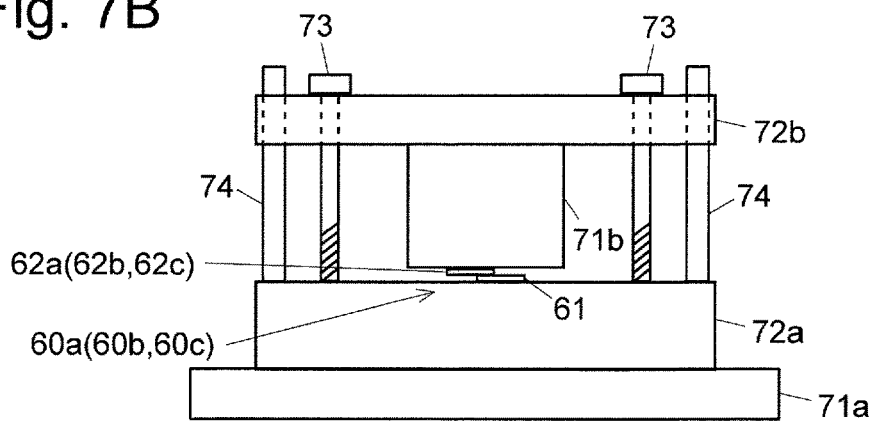

Fig. 9

|  | COP SAMPLE | 1ST METAL SAMPLE (Ru) | 2ND METAL SAMPLE (Ni-W) | 3RD METAL SAMPLE (Au) |
|---|---|---|---|---|
| BEFORE PLASMA TREATMENT | 100 | 96 | 118 | 50 |
| AFTER TREATMENT WITH WATER PLASMA | 4 | 12 | 10 | 40 |
| AFTER TREATMENT WITH OXYGEN PLASMA | 28 | 16 | 22 | 16 |

Fig. 10

|  | 400(N/cm$^2$) | 800(N/cm$^2$) | 1600(N/cm$^2$) | 2400(N/cm$^2$) |
|---|---|---|---|---|
| 80°C |  |  | × | × |
| 85°C |  |  | × | ○ |
| 90°C | × | × | ○ | ○ |
| 95°C | × | ○ | ○ |  |
| 100°C | ○ | ○ | ○(EXAMPLE 3) |  |
| 105°C | ○ |  |  |  |
| 110°C | ○ |  |  |  |

LEGEND: ○ ··· BONDED
× ··· NOT BONDED

1

METHOD FOR BONDING CYCLOOLEFIN POLYMER TO METAL, METHOD FOR PRODUCING BIOSENSOR, AND BIOSENSOR

TECHNICAL FIELD

The present invention relates to a technique for bonding cycloolefin polymer (COP) to a piece of metal.

BACKGROUND ART

In recent years, measurement devices called "biosensors" have been used for the measurement of the content of a specific biological substance (e.g. blood-sugar level) in a biological sample, such as blood, in the medical front. Biosensors are a type of device configured to determine the content of a specific biological substance in a biological sample using an enzymatic reaction, antigen-antibody reaction or other types of sensitive reaction which occurs between the specific biological substance and a specific chemical substance (reacting substance).

For example, a biosensor described in Patent Literature 1 includes an electrode plate having a substrate in the form of an elongated plate made of an insulating material, with a plurality of linear electrodes consisting of thin metallic films formed on the main surface of the substrate. Each electrode extends in the longitudinal direction of the electrode plate. A reacting substance selected for the biological substance to be detected is placed at a predetermined halfway position in the extending direction of the electrode.

On the main surface on which the electrodes are provided in the electrode plate, a double-sided tape which serves as a spacer is attached over almost the entire surface, exclusive of an area at one end of the main surface. A cover plate is attached to the other adhesive surface of the double-sided surface. In other words, the double-sided tape and the cover plate are arranged so as to expose one end portion of the main surface of the electrode plate (i.e. one end portion of the electrodes) while entirely covering the other portion of the main surface. The portion of the electrodes which is not covered by the cover plate or other parts forms a terminal portion for receiving an application of a voltage from an external source.

The spacer located between the electrode plate and the cover plate is divided at an intermediate position in the longitudinal direction of the electrode plate, and an elongated space exposed to the electrode and the reacting substance (i.e. an elongated space extending in the cross direction of the electrode plate) is formed at the divided portion between the electrode plate and the cover plate. This space forms a sample-holding space for holding a biological sample.

In the case of using this biosensor to measure the content of a biological substance contained in a biological sample, the biological sample (typically, blood) is initially introduced into the sample-holding space. Then, the specific biological substance contained in the biological sample reacts with the reacting substance to form a specific substance. In this situation, a predetermined amount of voltage is applied to the electrode portion (terminal portion) exposed at the end of the biosensor, whereupon an electric current corresponding to the amount of substance produced by the reaction flows between the electrodes. By measuring the amount of this current, the amount of substance can be determined, from which the amount of biological substance contained in the biological sample (e.g. the glucose concentration in the blood) can be determined.

CITATION LIST

Patent Literature

Patent Literature 1: JP 2011-203032 A

SUMMARY OF INVENTION

Technical Problem

In a biosensor, it is necessary to realize an accurate measurement with a small amount of biological sample. In order to minimize the amount of excessive biological sample that does not come into contact with the electrode and the reacting substance, while allowing the minimally required amount of biological sample to come into contact with the electrode and the reacting substance, it is preferable to decrease the size of the sample-holding space in the thickness direction of the biosensor.

However, in the biosensor described in Patent Literature 1, the size of the sample-holding space in the thickness direction of the biosensor cannot be smaller than the thickness of the double-sided tape which serves as the spacer.

Since biosensors are normally disposed of after being used only once for the measurement, it is necessary to maximally reduce their production cost. However, a biosensor including a pair of plates combined together via a double-sided tape in with the biosensor described in Patent Literature 1 requires a considerable number of parts as well as a considerable number of production steps, so that it is difficult to sufficiently reduce the production cost.

A possible approach to avoiding those problems is, for example, to previously form a groove on the cover plate and directly bond this cover plate to the electrode plate so that the groove forms the sample-holding space. According to this idea, the size of the sample-holding space in the thickness direction of the biosensor can be sufficiently decreased by sufficiently decreasing the depth of the groove. Directly bonding the electrode plate to the cover plate requires a smaller number of parts and a smaller number of production steps than in the case of using a spacer, so that the production cost can also be suppressed.

In recent years, cycloolefin polymer (COP) has been used as a suitable material for producing the cover plate. COP is a type of resin which is hydrophobic and therefore poorly adhesive to other members. Therefore, it has been impossible for a conventional technique to directly bond a cover plate made of COP to an electrode plate on which a metallic film is formed.

The present invention has been developed to solve such a problem. Its objective is to provide a technique by which a bond-target surface made of COP can be directly bonded to a bond-target surface made of metal.

Solution to Problem

The present invention developed for solving the previously described problem is a method for bonding a first member having a first bond-target surface made of cycloolefin polymer (COP) to a second member having a second bond-target surface made of metal, the method including:

a process of exposing the first bond-target surface and the second bond-target surface to at least one of the $H_2O$ plasma and $O_2$ plasma; and a process of combining the first bond-target surface and the second bond-target surface.

According to this method, the first bond-target surface made of COP and the second bond-target surface made of metal can be directly bonded together. A possible reason is as follows: The first bond-target surface made of COP is modified with a hydrophilic functional group (hydroxy group or carboxy group) by being exposed to at least one of the $H_2O$ plasma and $O_2$ plasma. The second bond-target surface made of metal is also given the hydrophilic functional group by being exposed to at least one of the $H_2O$ plasma and $O_2$ plasma. Those bond-target surfaces are subsequently combined together, which gives rise to dehydration between the functional groups on the two bond-target surfaces, forming a covalent bond between the two functional groups. Thus, the two bond-target surfaces are directly bonded together.

In the present invention, a process of applying pressure and heat to the first bond-target surface and the second bond-target surface may be additionally performed after the process of combining the first bond-target surface and the second bond-target surface.

In the previously described method, examples of the metal forming the second bond-target surface include Ru (ruthenium), Ni—W (nickel-tungsten), Au (gold), Al (aluminum) and Cu (copper). The metal may be in the form of a nano-ink (nano-paste) containing fine particles of the metal dispersed in a solvent and applied to or printed on a substrate.

Another aspect of the present invention is a method for producing a biosensor, including:

a process of preparing a cover plate having a first bond-target surface made of cycloolefin polymer (COP) with a concave portion formed on the first bond-target surface, as well as an electrode plate having a second bond-target surface on which a metallic film that functions as an electrode is formed;

a process of exposing the first bond-target surface and the second bond-target surface to at least one of the $H_2O$ plasma and $O_2$ plasma; and a process of combining the first bond-target surface and the second bond-target surface.

According to this method, the first bond-target surface made of COP and the second bond-target surface on which the metallic film that functions as an electrode is formed can be directly bonded together so that the cover plate and the electrode plate form a single body. Therefore, a double-sided tape or similar member for combining the two plates to make a single body is unnecessary, which reduces the production cost of the biosensor. The present biosensor also allows the depth of the concave portion formed in the cover plate to be adjusted so as to form a sample-holding space having a desired size in the thickness direction of the biosensor.

In particular, in the present method, when the first bond-target surface is treated with at least one of the $H_2O$ plasma and $O_2$ plasma, the concave portion formed in this surface (i.e. the concave portion forming the sample-holding space) is hydrophilized. Therefore, the sample can easily flow into the sample-holding space. This allows the measurement to be quickly and accurately performed with a small amount of sample.

In the present method, a process of applying pressure and heat to the first bond-target surface and the second bond-target surface may be additionally performed after the process of combining the first bond-target surface and the second bond-target surface.

Still another aspect of the present invention is a biosensor including:

a cover plate made of cycloolefin polymer (COP) with a concave portion formed on one main surface; and an electrode plate having a main surface on which a metallic film that functions as an electrode is formed, the main surface being directly bonded to the main surface on which the concave portion is formed in the cover plate.

In this biosensor, since the cover plate and the electrode plate are directly bonded together, a double-sided tape or similar member for combining the two plates to make a single body is unnecessary, so that the biosensor can be produced at a low cost. The depth of the concave portion formed in the cover plate can be adjusted so as to form a sample-holding space having a desired size in the thickness direction of the biosensor.

Advantageous Effects of Invention

According to the present invention, a bond-target surface made of COP can be directly bonded to a bond-target surface made of metal.

BRIEF DESCRIPTION OF DRAWINGS

FIG. 3B is a diagram showing the flow of a second process for the production of a biosensor.

FIG. 4 is a table showing plasma treatment conditions according to the first and second examples as well as the first through third reference examples.

FIG. 5 is a table summarizing the evaluation of the result of the bonding in the first and second examples as well as the first through third reference examples.

FIG. 6 is a table showing plasma treatment conditions according to the third and fourth examples.

FIGS. 7A and 7B are diagrams showing treatment conditions according to the third and fourth examples.

FIG. 8 is a table summarizing whether or not the bonding was achieved in the third and fourth examples as well as the first through third comparative examples.

FIG. 9 is a table summarizing the measured result of a pure-water contact angle after a plasma treatment.

FIG. 10 is a table summarizing whether or not the bonding was achieved under different temperature-and-pressure conditions.

DESCRIPTION OF EMBODIMENTS

A preferable embodiment of the present invention is hereinafter described with reference to the drawings.

1. Biosensor

<1-1. Configuration of Biosensor>

Figure 1:
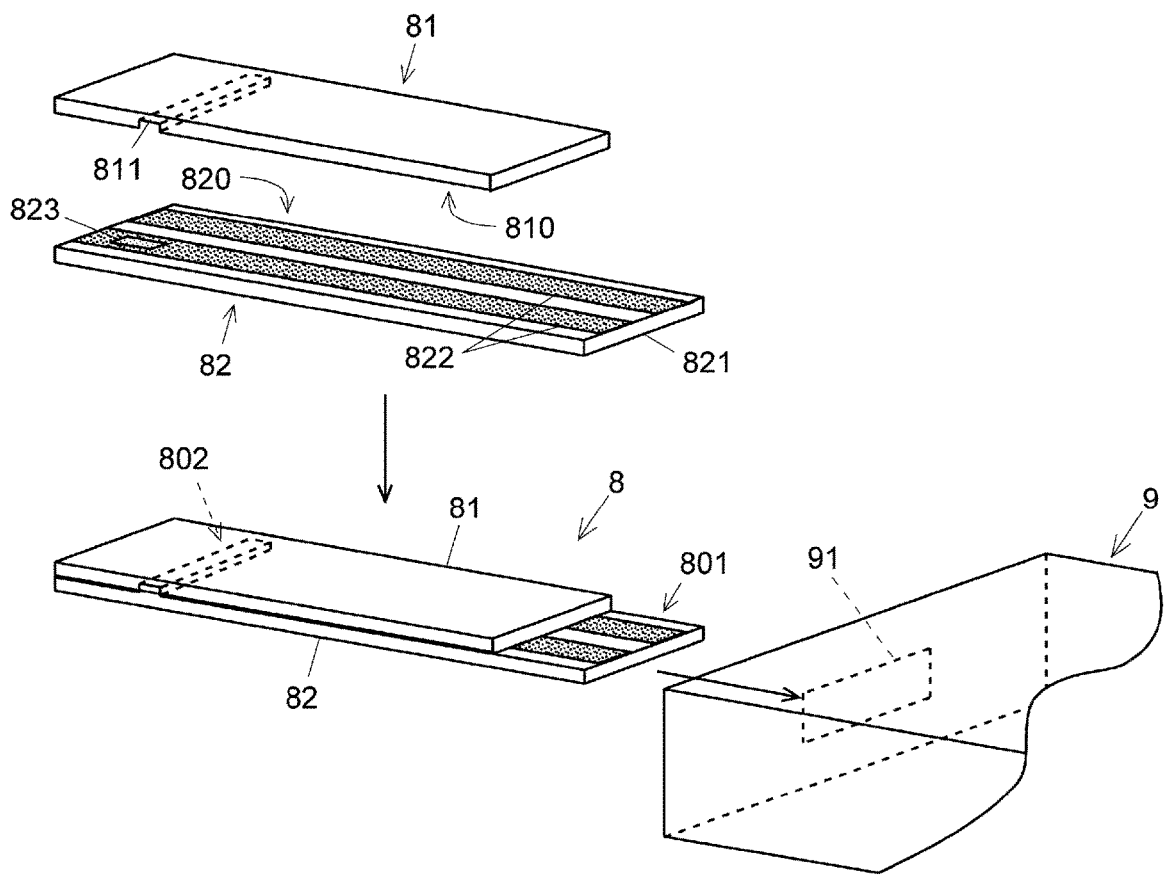
FIG. 1 is a diagram for explaining the configuration of a biosensor and its use form.

The configuration of a biosensor according to the present invention is hereinafter described with reference to FIG. 1. FIG. 1 is a diagram for explaining the configuration of a biosensor 8 and its use form.

The biosensor 8 includes a cover plate 81 and an electrode plate 82 which is directly bonded to the cover plate 81.

The cover plate 81 is a plate in the form of an elongated rectangular plate made of cycloolefin polymer (COP). On one main surface 810 of the cover plate 81, a groove (concave portion) 811 extending in the cross direction of the cover plate 81 is formed, with the two ends of the groove open on the two side surfaces of the cover plate 81, respectively.

The electrode plate 82 includes a base plate 821 serving as the substrate. The base plate 821 is a member in the form of a rectangular plate whose shape is approximately identical to the cover plate 81 except for its longitudinal size being slightly longer than the cover plate 81. The base plate 821 is made of an insulating material (for example, polyethylene terephthalate (PET), glass or COP).

On one main surface of the base plate 821, a plurality of (in the shown example, two) linear electrodes 822, 822 made of metallic films are formed. Each electrode 822 extends over the entire length of the base plate 821. Typical examples of the metal for the electrodes 822 include Ru (ruthenium), Ni—W (nickel-tungsten), Au (gold), Ag (silver), Al (aluminum) and Cu (copper), although other kinds of metal may also be used for the electrodes 822. The electrodes 822 may also be in the form of a nano-ink (nano-paste) containing fine particles of the aforementioned metal dispersed in a solvent and applied to or printed on the base plate 821.

At a predetermined halfway position in the extending direction of the electrode 822 (the portion corresponding to the concave portion 811), a reacting substance 823 selected for the biological substance to be subjected to the measurement is placed.

The biosensor 8 is formed by directly bonding the main surface 810 on which the concave portion 811 is formed in the cover plate 81, to the main surface 820 on which the electrodes 822, 822 are provided in the electrode plate 82 (the form of the bonding of the two plates 81 and 82 will be described later).

As described earlier, the longitudinal size of the cover plate 81 is slightly larger than that of the electrode plate 82. Therefore, in the state in which the two plates 81 and 82 are bonded together, the cover plate 81 almost entirely covers the main surface 820 of the electrode plate 82, while exposing one end portion of the main surface 820 (i.e. the end portion of each electrode 822). The end portion of each electrode 822 which is not covered by the cover plate 81 forms a terminal portion 801 for receiving an application of a voltage from an external source.

In the state in which the two plates 81 and 82 are bonded together, an elongated space exposed to the electrodes 822 and the reacting substance 823 (i.e. an elongated space extending in the cross direction of the biosensor 8) is formed between the two plates 81 and 82 at a portion of the cover plate 81 at which the concave portion 811 is formed. This space forms the sample-holding space 802 for holding a biological sample.

<1-2. Use Form of Biosensor>

A description of a use form of the biosensor 8 is hereinafter given, still referring to FIG. 1.

Initially, the terminal portion 801 of the biosensor 8 is inserted into an external device 9 through an opening 91. In this state, a biological sample (e.g. blood) is put into the sample-holding space 802 of the biosensor 8. Then, a specific biological substance contained in the biological sample reacts with the reacting substance 823, whereby a specific substance is formed.

The external device 9 applies a predetermined voltage to the terminal portion 801 of the biosensor 8 (more specifically, between the electrodes 822, 822), and measures the amount of electric current induced by the voltage between the electrodes 822, 822. Based on the measured electric current, the amount of substance produced by the reaction (and ultimately, the amount of biological substance contained in the biological sample) is determined.

2. Bonding Form

<2-1. Plasma Treatment Device>

Figure 2:
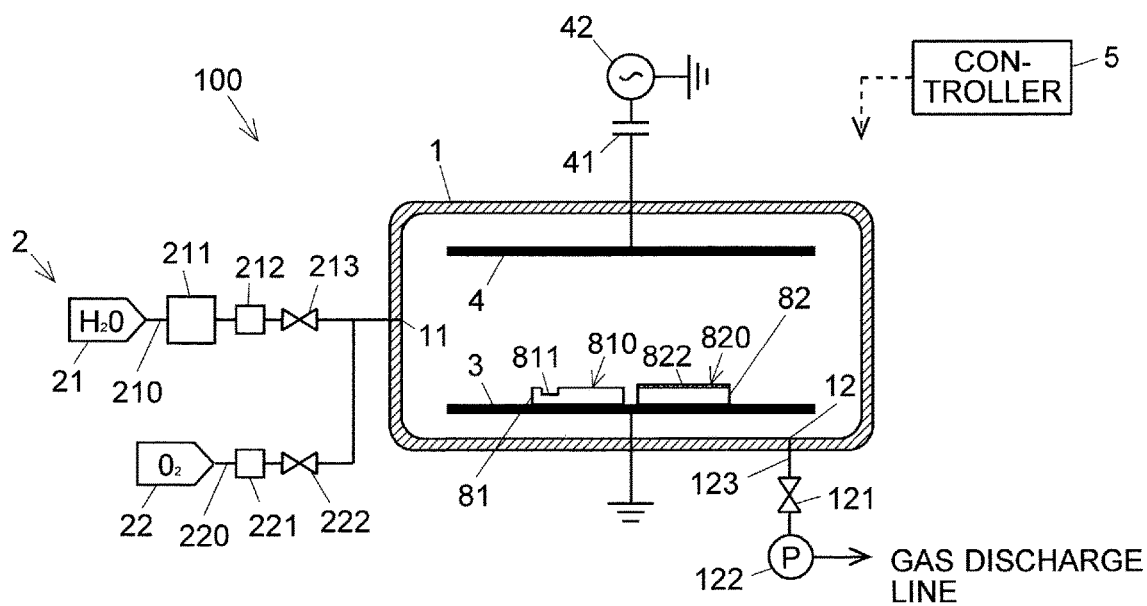
FIG. 2 is a schematic configuration diagram of a plasma treatment device.

A method for producing the biosensor 8 is hereinafter described. Before the specific description of the method, the configuration of the plasma treatment device used in the same method is described with reference to FIG. 2. FIG. 2 is a diagram showing the schematic configuration of the plasma treatment device 100.

The plasma treatment device 100 (manufactured by Samco Inc.; product name: AQ-2000) is a parallel-plate (capacitively-coupled) plasma treatment device. This device includes a treatment chamber 1 configured to internally form a treatment space, a gas supplier 2 configured to supply gas into the treatment chamber 1, as well as a pair of electrodes 3 and 4 facing each other in the vertical direction within the treatment chamber 1. The plasma treatment device 100 also includes a controller 5 configured to control the components of the device.

The treatment chamber 1 has a gas introduction port 11 for introducing gas into the chamber, and a gas discharge port 12 for discharging gas from the treatment chamber 1. A gas supplier 2 is connected to the gas introduction port 11. A pipe 123 in which a valve 121 and a vacuum pump 122 are provided is connected to the gas discharge port 12. The treatment chamber 1 additionally has a gateway (not shown) through which an object to be treated is carried into the chamber, and a load lock (not shown) for closing the gateway.

The gas supplier 2 includes a water supply source 21 for supplying water and an oxygen gas supply source 22 for supplying oxygen gas. Those supply sources 21 and 22 are connected to the gas introduction port 11 via pipes 210 and 220, respectively. A vaporizer 211 for vaporizing water to generate water vapor, a mass flow controller 212, and a valve 213 are provided in the pipe 210 connected to the water supply source 21. A mass flow controller 221 and a valve 222 are provided in the pipe 220 connected to the oxygen gas supply source 22.

The lower electrode 3 of the pair of electrodes 3 and 4 facing each other in the vertical direction within the treatment chamber 1 has an upper surface which serves as a placement surface on which an object to be treated is to be placed. An electrostatic chuck (or the like, which is not shown) for fixing the object to be treated is provided on the same upper surface. The lower electrode 3 is grounded. A radio-frequency power source 42 is connected to the upper electrode 4 via a capacitor 41.

The controller 5 is constructed by using a personal computer or similar device as a hardware resource, with various functional components realized by executing dedicated controlling-processing software installed on the same computer. A display unit (not shown) consisting of a liquid crystal display or the like, as well as an input unit (not shown) formed by a mouse, keyboard, touch panel and other devices, are connected to the controller 5.

The controller 5 is electrically connected to the vaporizer 211, mass flow controllers 212 and 221, as well as valves 213 and 222, to control the kind and flow rate of gas to be introduced into the treatment chamber 1, the timings of the introduction and termination of the same gas, as well as other related parameters, respectively. The controller 5 is also electrically connected to the valve 121 and the pump 122, to control the timings to turn on and off the discharging of the gas from the treatment chamber 1, as well as other related parameters, respectively. The controller 5 is also electrically connected to the radio-frequency power source 42 to control the timing to supply radio-frequency power to the upper electrode 4, the value of the power, and other related parameters.

<2-2. Process Flow>

Figure 3A:
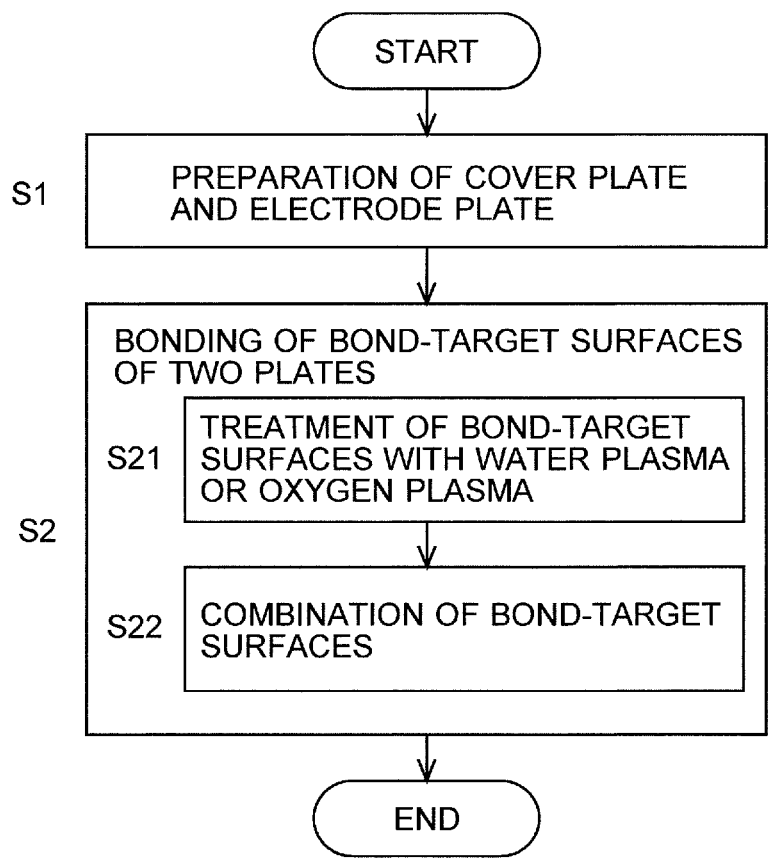
FIG. 3A is a diagram showing the flow of a first process for the production of a biosensor.

A method for producing the biosensor 8 is hereinafter described with reference to FIG. 3A. FIG. 3A is a diagram showing the flow of a process for the production of the biosensor 8.

Step S1: Initially, the cover plate 81 and the electrode plate 82 are prepared. The specific configurations of those plates 81 and 82 are as already described.

Step S2: Next, the main surface 810 on which the concave portion 811 is formed in the cover plate 81 is bonded to the main surface 820 on which the electrodes 822 are formed in the electrode plate 82. The following description specifically deals with the processing of Step S2. It should be noted that the main surface 810 to be bonded to the electrode plate 82 in the cover plate 81 is hereinafter called the "first bond-target surface 810", while the main surface 820 to be bonded to the cover plate 81 in the electrode plate 82 is called the "second bond-target surface 820".

Step S21: Initially, the first bond-target surface 810 of the cover plate 81 and the second bond-target surface 820 of the electrode plate 82 are treated with $H_2O$ plasma or $O_2$ plasma. For example, this treatment is performed by the previously described plasma treatment device 100.

In that case, initially, the cover plate 81 and the electrode plate 82 are carried into the treatment chamber 1 through the gateway (not shown). The plates 81 and 82 are placed on the lower electrode 3 and fixed with an electrostatic chuck, with their respective bond-target surfaces 810 and 820 directed upward.

Subsequently, $H_2O$ plasma or $O_2$ plasma is formed within the treatment chamber 1. Specific steps are as follows: After the gateway is closed to form a closed space within the treatment chamber 1, the gas supplier 2 begins to introduce water vapor or oxygen gas into the chamber. Simultaneously, the gas within the chamber is discharged to maintain the pressure within the chamber at a predetermined level. It is preferable to maintain the inner pressure of the treatment chamber 1 at a lower level than the atmospheric pressure during the plasma treatment process. In particular, when the pressure in the plasma treatment process is equal to or higher than the atmospheric pressure, the temperature at which the $H_2O$ plasma is formed becomes equal to or higher than 100 degrees Celsius. At such a high temperature, the first bond-target surface made of cycloolefin polymer tends to be deformed or deteriorated. Accordingly, it is more preferable to maintain the pressure within a range from 0.1 Pa to 2000 Pa during the plasma treatment.

Subsequently, radio-frequency power is supplied from the radio-frequency power source 42 to the upper electrode 4. The gas introduced into the treatment chamber 1 is thereby turned into a cloud of plasma. Needless to say, $H_2O$ plasma (water plasma) within the treatment chamber 1 is generated if water vapor is introduced into the treatment chamber 1, while $O_2$ plasma (oxygen plasma) is generated if oxygen gas is introduced into the treatment chamber 1. The bond-target surfaces 810 and 820 of the plates 81 and 82 placed on the lower electrode 3 are exposed to the plasma generated within the treatment chamber 1, whereby the bond-target surfaces 810 and 820 are progressively treated with the plasma.

When the predetermined treatment period has been elapsed since the beginning of the plasma treatment, the gas supplier 2 discontinues the introduction of the water vapor or oxygen gas into the treatment chamber 1. The supply of the radio-frequency power from the radio-frequency power source 42 to the upper electrode 4 is also discontinued to complete the plasma treatment. After the inner pressure of the treatment chamber 1 is restored to atmospheric pressure, the plates 81 and 82 are removed from the treatment chamber 1.

Step S22: Subsequently, the plasma-treated bond-target surfaces 810 and 820 of the two plates 81 and 82 are combined together.

Through the processing of Steps S21 and S22, the two bond-target surfaces 810 and 820 are directly bonded together. A possible reason for this is as follows: The first bond-target surface 810 is modified with a hydrophilic functional group (hydroxy group or carboxy group) by the plasma treatment in Step S21. The hydrophilic functional group is also given to the second bond-target surface 820. When the two plasma-treated bond-target surfaces 810 and 820 are combined together in Step S22, the functional groups on the two bond-target surfaces 810 and 820 come sufficiently close to each other to form a hydrogen bond. This gives rise to dehydration between the functional groups on the two bond-target surfaces 810 and 820, forming a covalent bond between the two functional groups. Thus, the two bond-target surfaces 810 and 820 are directly bonded together.

Through the direct bonding of the first bond-target surface 810 of the cover plate 81 to the second bond-target surface 820 of the electrode plate 82, the biosensor 8 is obtained.

A process of applying pressure and heat to the two bond-target surfaces 810 and 820 may additionally be performed after the processing of Step S22. In that case, the flow of the process for the production of the biosensor 8 will be as shown in FIG. 3B. That is to say, in the present case, the process flow is modified so that Step S2 in FIG. 3A is renamed to Step S2B, and Step S23 is added after Step S22 in Step S2B. A description of Step S23 is as follows.

Step S23: Subsequently to Step S22, pressure and heat are applied to the two bond-target surfaces 810 and 820 which have been combined together. In other words, the two bond-target surfaces 810 and 820 are heated while being compressed. A specific example of this process is illustrated in FIG. 7B, in which a pair of heaters 71a and 71b as well as a pair of metallic blocks 72a and 72b are used as follows: The metallic block 72a is placed on one heater 71a. A target object (in the present case, the pair of plates 81 and 82 with their respective bond-target surfaces 810 and 820 combined together) is placed on the metallic block 72a. Then, the other heater 71b and the other metallic block 72b are placed on the pair of plates in the mentioned order. The upper metallic block 72b is urged toward the lower metallic block 72a by the urging members 73 to compress the object between those blocks. Meanwhile, the heaters 71a and 71b are controlled to have a predetermined temperature to heat the object between the blocks.

The pressure to be applied to the two bond-target surfaces 810 and 820 can be set within a range from 400 $(N/cm^2)$ to 2400 $(N/cm^2)$, inclusive. For example, if the pressure is set at 1600 $(N/cm^2)$, the heating temperature of the bond-target surfaces 810 and 820 may be set within a range from 90 to 150 degrees Celsius, inclusive. In particular, it is preferable to set the temperature within a range from 95 to 150 degrees Celsius, inclusive. The period of time to apply the heat and pressure may be set at five minutes, for example.

The processing of Steps S21 through S23 also results in the direct bonding of the two bond-target surfaces 810 and 820. A possible reason for this is as follows: The first bond-target surface 810 is modified with a hydrophilic functional group (hydroxy group or carboxy group) by the plasma treatment in Step S21. The hydrophilic functional group is also given to the second bond-target surface 820. After the two plasma-treated bond-target surfaces 810 and 820 have been combined together in Step S22, when the pressure is applied in Step S23, the functional groups on the two bond-target surfaces 810 and 820 come sufficiently close to each other to form a hydrogen bond. In this state, heat is additionally applied, which gives rise to dehydration between the functional groups on the two bond-target surfaces 810 and 820, forming a covalent bond between the two functional groups. Thus, the two bond-target surfaces 810 and 820 are directly bonded together.

Through the direct bonding of the first bond-target surface 810 of the cover plate 81 to the second bond-target surface 820 of the electrode plate 82, the biosensor 8 is obtained.

3. Examples

First Example

A COP sample (measuring 15 mm×10 mm, with a thickness of 0.5 mm, manufactured by Zeon Corporation and marketed as ZEONOR1060R) and a metal sample consisting of a titan wafer with a gold film formed on its surface by a sputtering process (measuring 15 mm 15×10 mm, with an average roughness Ra of 1.332 nm at the gold-film portion) were prepared. One main surface of the COP sample and the main surface of the metal sample on which the metallic film was formed were treated with $H_2O$ plasma. The treatment conditions were as shown in FIG. 4. The radio-frequency power was 100 W. The flow rate of the water vapor was sccm. The internal pressure of the treatment chamber was 5 Pa. The treatment period was 80 seconds. The treatment mode of the plasma treatment device was the PE mode.

Next, the $H_2O$-plasma-treated main surface of the metal sample and that of the COP sample were combined together. Specifically, the metal sample and the COP sample were combined so that their respective main surfaces overlap each other over a square area of 10 mm×10 mm.

Subsequently, the other main surface of the metal sample and that of the COP sample were simultaneously pulled by a tensile tester to measure the strength of the bonded area. The strength was measured three times, and its average value was calculated.

First Reference Example

The bonded sample created in the first example was compressed at a room temperature (24 degrees Celsius). An average value of the bonding strength was calculated in the same manner as in the first example. For the compression of the bonded sample, the bonded sample was placed on a first metallic block. A second metallic block was placed on that bonded sample, and pressure was applied onto the top surface of the second block by a hydraulic cylinder. The amount of pressure was 4900 (N/cm$^2$). The pressing period was 10 minutes.

Second Example

An average value of the bonding strength was calculated in a similar manner to the first example, except that a COP sample (measuring 15 mm×10 mm, with a thickness of 50 μm, manufactured by Zeon Corporation and marketed as ZEONORZF14-050) was used.

Second Reference Example

An average value of the bonding strength was calculated in a similar manner to the first reference example, except that a COP sample (measuring 15 mm×10 mm, with a thickness of 50 μm, manufactured by Zeon Corporation and marketed as ZEONORZF14-050) and a metal sample consisting of a silicon wafer with an aluminum film formed on its surface by vapor deposition (with a film thickness of 300 nm and average roughness Ra of 5.462 nm at the aluminum-film portion) were used.

Third Reference Example

An average value of the bonding strength was calculated in a similar manner to the second reference example, except that a metal sample consisting of a silicon wafer with a copper film formed on its surface by vapor deposition (with a film thickness of 1 μm and average roughness Ra of 3.032 nm at the copper-film portion) was used.

FIG. 5 shows a table summarizing the evaluation of the result of the bonding in the first and second examples as well as the first through third reference examples prepared in the previously described manner. It was confirmed that the bonding was sufficient even in the cases of the first and second examples in which no pressure was applied.

Third Example

Three pieces of rectangular COP films (measuring 10 mm×20 mm, with a thickness of 0.5 mm) were prepared as COP samples 61. Three kinds of metal samples (first metal sample 62a, second metal sample 62b and third metal sample 62c) were also prepared. The first metal sample 62a was a piece of PET film (measuring 10 mm×20 mm) with one main surface coated entirely with a thin film of Ru (ruthenium). The second metal sample 62b was a piece of PET film (measuring 10 mm×20 mm) with one main surface coated entirely with a thin film of Ni—W (nickel-tungsten). The third metal sample 62c was a piece of PET film (measuring 10 mm×20 mm) with one main surface coated entirely with a thin film of Au (gold).

One main surface of each of the three COP samples 61 as well as the main surface coated with the metallic film in each of the three metal samples 62a, 62b and 62c were treated with $H_2O$ plasma. The treatment conditions were as shown in FIG. 6. The radio-frequency power was 100 W. The flow rate of the water vapor was 20 sccm. The internal pressure of the treatment chamber was 5 Pa. The treatment period was 40 seconds. A plasma treatment device manufactured by Samco Inc. (product name: AQ-2000) was used as the plasma treatment device (the treatment mode was the PE mode).

Next, the $H_2O$-plasma-treated main surface of the first metal sample 62a and that of the COP sample 61 were combined together. Specifically, as shown in FIG. 7A, the first metal sample 62a and the COP sample 61 were combined so that their respective main surfaces overlapped each other over a square area of 10 mm×10 mm. The task of combining the H₂O-plasma-treated main surface of the metal sample with that of the COP sample 61 was also similarly performed for each of the second and third metal samples 62b and 62c.

Next, the sample pairs in each of which the main surface of the COP sample 61 was combined with that of the metal sample 62a, 62b or 62c (i.e. the first sample pair 60a in which the first metal sample 62a was combined with the COP sample 61, second sample pair 60b in which the second metal sample 62b was combined with the COP sample 61, and the third sample pair 60c in which the third metal sample 62c was combined with the COP sample 61) were heated and compressed.

Specifically, each sample pair 60a, 60b or 60c was sandwiched between thin plates of $SiO_2$, which was heated and compressed by the device shown in FIG. 7B. That is to say, each sample pair 60a, 60b or 60c sandwiched between the thin plates of $SiO_2$ was placed on the first metallic block 72a (which was placed on the first heater 71a). The second heater 71b and the second metallic block 72b were placed in the mentioned order on the sample pair. The second metallic block 72b was mounted in a vertically movable fashion on a pair of guide poles 74, 74 which were fixed upright on the first metallic block 72a. A predetermined amount of load was applied to the second metallic block 72b by a pair of urging members 73, 73 to urge this block toward the first metallic block 72a. For example, each urging member 73 can be formed by a screw member penetrating through the second metallic block 72b from above, with its lower end threaded into a screw hole formed in the first metallic block 72a. In that case, the magnitude of the pressure applied to the sample pair 60a, 60b or 60c can be controlled by the amount of torque applied to the upper end of each urging member 73. In the present example, the temperature of the two heaters 71a and 71b was set at 100 degrees Celsius. The amount of pressure applied to the sample pair 60a, 60b or 60c was 1600 (N/cm²). The heating and compressing period was 5 minutes.

The three sample pairs 60a, 60b and 60c subjected to the series of processes according to the third example were visually examined to determine whether or not the COP sample 61 was bonded to each metal sample 62a, 62b or 62c. As a result, as shown in the table of FIG. 8, it was confirmed that the COP sample 61 was bonded to the metal sample 62a, 62b or 62c in all of the first through third sample pairs 60a, 60b and 60c.

As described earlier, a possible reason for the successful bonding of the COP sample 61 to each metal sample 62a, 62b or 62c is the formation of the hydrophilic functional group on the bond-target surface of each of the samples 61, 62a, 62b and 62c by the plasma treatment, as well as the formation of the covalent bond between the functional groups on the two bond-target surfaces through the heating and compression. In order to verify this, the pure-water contact angle of the bond-target surface of each sample 61, 62a, 62b or 62c was measured after the H₂O-plasma treatment under the previously described treatment conditions. The obtained measurement result was as shown in FIG. 9. Thus, it was demonstrated that the bond-target surfaces of the samples 61, 62a, 62b and 62c were hydrophilized (a hydrophilic functional group was formed on those bond-target surfaces) through the H₂O-plasma treatment.

Fourth Example

The same set of samples 61, 62a, 62b and 62c as used in the third example were treated with O₂ plasma. The main surfaces of those samples were partially combined with each other in the previously described manner to prepare three sample pairs 60a, 60b and 60c, which were subsequently heated and compressed. The plasma treatment conditions were the same as used in the third example, except that the kind of gas was changed from water vapor to oxygen (FIG. 6). The heating and compressing conditions were the same as used in the third example.

The three sample pairs 60a, 60b and 60c subjected to the series of processes according to the fourth example were visually examined to determine whether or not the COP sample 61 was bonded to each metal sample 62a, 62b or 62c. As a result, as shown in the table of FIG. 8, it was confirmed that the COP sample 61 was bonded to the metal sample 62a, 62b or 62c in all of the first through third sample pairs 60a, 60b and 60c.

Once again, the pure-water contact angle of the bond-target surface of each sample 61, 62a, 62b or 62c was measured after the O₂-plasma treatment under the previously described treatment conditions. The obtained measurement result was as shown in FIG. 9. Thus, it was demonstrated that the bond-target surfaces of the samples 61, 62a, 62b and 62c were hydrophilized (a hydrophilic functional group was formed on those bond-target surfaces) through the O₂-plasma treatment.

<First Comparison Experiment>

First Comparative Example

The H₂O-plasma treatment in the third example was omitted. Specifically, three sample pairs 60a, 60b and 60c were prepared from the same set of samples 61, 62a, 62b and 62c as used in the third example by partially combining their respective main surfaces with each other in the previously described manner, yet without performing any plasma treatment. Those sample pairs were subsequently heated and compressed. The compressing and heating conditions were the same as used in the third example.

Second Comparative Example

The heating and compressing operation in the third example was omitted. Specifically, three sample pairs 60a, 60b and 60c were prepared from the same set of samples 61, 62a, 62b and 62c as used in the third example by partially combining their respective main surfaces with each other in the previously described manner after treating those samples with H₂O plasma, yet without performing the heating and compressing operation. The plasma treatment conditions were the same as used in the third example.

Third Comparative Example

The heating and compressing operation in the fourth example was omitted. Specifically, three sample pairs 60a, 60b and 60c were prepared from the same set of samples 61, 62a, 62b and 62c as used in the fourth example by partially combining their respective main surfaces with each other in the previously described manner after treating those samples with O₂ plasma, yet without performing the heating and compressing operation. The plasma treatment conditions were the same as used in the fourth example.

The three sample pairs 60a, 60b and 60c subjected to the processing according to each of the first through third comparative examples were visually examined to determine whether or not the COP sample 61 was bonded to each metal sample 62a, 62b or 62c. As a result, as shown in the table of FIG. 8, the COP sample 61 was not bonded to the metal sample 62a, 62b or 62c in any of the first through third comparative examples.

<Second Comparison Experiment>

A plurality of COP samples 61, each of which was the same as the COP sample 61 in the third example (a piece of rectangular COP film measuring 10 mm×20 mm, with a thickness of 0.5 mm), and a plurality of first metal samples 62a, each of which was the same as the first metal sample 62a in the third example (a piece of PET film measuring 10 mm×20 mm, with one main surface entirely coated with a thin film of Ru), were prepared. One main surface of each COP sample 61, and the main surface coated with the metallic film in each first metal sample 62a, were treated with $H_2O$ plasma. The plasma treatment conditions were the same as used in the third example. Subsequently, as in the third example, the $H_2O$-plasma-treated main surface of each first metal sample 62a and that of each COP sample 61 were combined together (see FIG. 7A). Each sample pair (first sample pair 60a) consisting of the first metal sample 62a and the COP sample 61 with their respective main surfaces combined together was heated and compressed by the same method as used in the third example (see FIG. 7B). It should be noted that the plurality of sample pairs 60a in the present experiment were individually heated and compressed under different temperature-and-pressure conditions by controlling the temperature of the pair of heaters 71a and 71b as well as the torque applied to the upper end of each urging member 73. The heating and compressing period was five minutes for all samples.

The sample pairs 60a which had been individually heated and compressed under different temperature-and-pressure conditions were visually examined to determine whether or not the COP sample 61 was bonded to the metal sample 62a. FIG. 10 shows a table summarizing the result. As shown in the table, for example, when the applied pressure was 400 (N/cm$^2$), the bonding was achieved at a temperature equal to or higher than 100 degrees Celsius. When the applied pressure was 2400 (N/cm$^2$), the bonding was achieved at a temperature equal to or higher than 85 degrees Celsius. These results demonstrate that increasing the applied pressure allows the bonding to be achieved at a lower heating temperature (from a different perspective, this means that increasing the heating temperature allows the bonding to be achieved with a lower level of pressure).

Furthermore, for example, when the applied pressure was 1600 (N/cm$^2$), the bonding was achieved at a temperature equal to or higher than 90 degrees Celsius. However, it was found that increasing the heating temperature to 150 degrees Celsius under that pressure would cause the COP sample 61 to be deformed, although the bonding was achieved. Therefore, it is possible to conclude that an appropriate temperature range is from 90 to 150 degrees Celsius, inclusive, when the applied pressure is 1600 (N/cm$^2$). In particular, a sufficiently strong bond can be achieved without causing the deformation of the COP sample 61 by setting the heating temperature within a range from 95 to 150 degrees Celsius, inclusive.

4. Modified Examples

The previous embodiment has been concerned with a method for obtaining the biosensor 8 by bonding the cover plate 81 and the electrode plate 82 by applying the method according to the present invention. The scope of application of the method according to the present invention is not limited to the previous embodiment. It can be used in a wide variety of cases in which a member having a bond-target surface made of COP should be bonded to a member having a bond-target surface made of metal.

In the previous embodiment, the method according to the present invention was used to bond the bond-target surface made of COP (first bond-target surface 810) to the bond-target surface made of metal (Ru, Ni—W, Au, silver or the like) that functions as an electrode (second bond-target surface 820). The method according to the present invention can also be used to bond a bond-target surface made of various kinds of metal other than those which function as electrodes to the bond-target surface made of COP.

In the previous embodiment, the plasma treatment of the plates 81 and 82 is performed in the PE (plasma etching) mode by the plasma treatment device 100 in which the lower electrode 3 on which the target object is placed is grounded, while the radio-frequency power source 42 is connected to the upper electrode 4. It is also possible to perform the plasma treatment in the RIE (reactive ion etching) mode, in which case the radio-frequency power source is connected to the lower electrode 3 on which the target object is placed, while the upper electrode 4 is grounded.

In Step S2 according to the previous embodiment, the first bond-target surface 810 and the second bond-target surface 820 are treated with $H_2O$ plasma or $O_2$ plasma. It is also possible to treat those surfaces with a mixed plasma containing at least $H_2O$ plasma or $O_2$ plasma. For example, they may be treated with a mixture of $H_2O$ plasma and $O_2$ plasma, or they may be treated in ambient gas in which $H_2O$ plasma (or $O_2$ plasma) is mixed with a different kind of gas, such as nitrogen ($N_2$), ammonia ($NH_3$), hydrogen ($H_2$), argon (Ar) or helium (He).

In Step S23 according to the previous embodiment, the heating and compressing operations for the bond-target surfaces 810 and 820 combined together are simultaneously performed. In some cases, the compressing operation may be performed after the heating operation, or vice versa.

REFERENCE SIGNS LIST

8 . . . Biosensor
801 . . . Terminal Portion
802 . . . Sample-Holding Space
81 . . . Cover Plate
810 . . . First Bond-Target Surface
811 . . . Concave Portion
82 . . . Electrode Plate
820 . . . Second Bond-Target Surface
821 . . . Base Plate
822 . . . Electrode
823 . . . Reacting Substance
100 . . . Plasma Treatment Device
71a, 71b . . . Heater
72a, 72b . . . Metallic Block
73 . . . Urging Member
74 . . . Guide Pole

The invention claimed is:

1. A bonding method for bonding a first member having a first bond-target surface made of cycloolefin polymer to a second member having a second bond-target surface made of metal, the bonding method comprising:
   a process of exposing the first bond-target surface and the second bond-target surface to at least one of $H_2O$ plasma and $O_2$ plasma, the first bond-target surface having at least one groove;
   a process of combining the first bond-target surface and the second bond-target surface; and a process of bonding the first bond-target surface and the second bond-target surface without filling the groove by molten cycloolefin polymer by applying pressure and heat to the first bond-target surface and the second bond-target surface after the process of combining the first bond-target surface and the second bond-target surface, wherein a heating temperature in the process of bonding the first bond-target surface and the second bond-target surface is in a range of 90° C. to 150° C.

2. The method according to claim 1, further comprising:

a process of preparing a cover plate having the first bond-target surface with a concave portion formed on the first bond-target surface, as well as an electrode plate having the second bond-target surface on which a metallic film that functions as an electrode is formed.

* * * * *